United States Patent
Roslak

(10) Patent No.: US 6,367,694 B1
(45) Date of Patent: Apr. 9, 2002

(54) DEVICE AND METHOD FOR SECURE DATA UPDATES IN A SELF-CHECKOUT SYSTEM

(75) Inventor: Thomas Roslak, Eastport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/436,170

(22) Filed: Nov. 9, 1999

Related U.S. Application Data

(63) Continuation of application No. 09/153,832, filed on Sep. 15, 1998, now Pat. No. 5,979,753, which is a continuation of application No. 08/706,579, filed on Sep. 5, 1996, now Pat. No. 5,825,002.

(51) Int. Cl.$^7$ .................................................. G06K 5/00
(52) U.S. Cl. ....................................... 235/380; 235/383
(58) Field of Search ................................. 455/419, 403, 455/325, 375; 235/380, 462.01, 472.01, 472.02, 472.03, 375, 383; 705/35–45

(56) References Cited

U.S. PATENT DOCUMENTS

| | | | |
|---|---|---|---|
| 4,071,740 A | 1/1978 | Gogulski | 235/431 |
| 4,627,193 A | 12/1986 | Schwarz | 49/42 |
| 4,634,845 A | 1/1987 | Hale et al. | 235/350 |
| 4,723,212 A | 2/1988 | Mindrum et al. | 364/401 |
| 4,833,308 A | 5/1989 | Humble | 235/383 |
| 4,910,672 A | 3/1990 | Off et al. | 364/405 |
| 4,929,819 A | 5/1990 | Collins | 235/383 |
| 4,940,116 A | 7/1990 | O'Connor et al. | 186/61 |
| 4,949,256 A | 8/1990 | Humble | 364/401 |
| 4,973,952 A | 11/1990 | Malec et al. | 340/825 |
| 5,072,380 A | 12/1991 | Randelman et al. | 364/406 |
| 5,173,851 A | 12/1992 | Off et al. | 364/401 |
| 5,237,620 A | 8/1993 | Deaton et al. | 382/7 |
| 5,250,789 A | 10/1993 | Johnson | 235/383 |
| 5,287,266 A | 2/1994 | Malec et al. | 364/401 |
| 5,295,064 A | 3/1994 | Malec et al. | 364/401 |
| 5,334,821 A | 8/1994 | Campo et al. | 235/380 |
| 5,345,071 A | 9/1994 | Dumont | 235/383 |
| 5,354,974 A | 10/1994 | Eisenberg | 235/379 |
| 5,361,871 A | 11/1994 | Gupta et al. | 186/61 |
| 5,380,991 A | 1/1995 | Valencia et al. | 235/383 |
| 5,393,965 A | 2/1995 | Bravman et al. | 235/383 |
| 5,397,882 A | 3/1995 | Van Solt | 235/381 |
| 5,412,193 A | 5/1995 | Swartz et al. | 235/383 |
| 5,418,354 A | 5/1995 | Halling et al. | 235/383 |
| 5,418,713 A | 5/1995 | Allen | 364/403 |
| 5,424,524 A | 6/1995 | Rappert et al. | 235/462 |
| 5,434,394 A | 7/1995 | Roach et al. | 235/375 |
| 5,457,307 A | 10/1995 | Dumont | 235/383 |

(List continued on next page.)

FOREIGN PATENT DOCUMENTS

| | | |
|---|---|---|
| EP | W/O 90/08440 | 7/1990 |
| EP | W/O 92/14210 | 8/1992 |
| EP | W/O 92/20030 | 11/1992 |
| EP | W/O 94/09440 | 4/1994 |
| JP | 55153068 A * | 5/1979 |
| JP | 2001125965 * | 10/1999 |
| NL | 9002296 | 10/1990 |

OTHER PUBLICATIONS

Symbol Product Brochure "LST3803–Portable Personal Shopper" 4 pages.

*Primary Examiner*—Thien M. Le

(57) ABSTRACT

The present invention relates to a data processing and retrieval system for use in a self-checkout system utilized in a retail facility. A plurality of customers are provided with a portable data collecting terminal having a bar code reader. Once the data is collected using the portable terminal, a record of the session is uploaded to a customer's data file upon the entry of an authorization code. In the event errors occur during data entry or in the entry of the authorization codes, a customer service desk is provided which assists the customer in completing the transaction.

6 Claims, 3 Drawing Sheets

U.S. PATENT DOCUMENTS

| | | | |
|---|---|---|---|
| 5,468,942 A | 11/1995 | Oosterveen et al. | 235/383 |
| 5,468,948 A | 11/1995 | Koenck et al. | 235/472 |
| 5,489,773 A | 2/1996 | Kumar | 235/462 |
| 5,535,407 A | 7/1996 | Yanagawa et al. | 395/800 |
| 5,572,653 A | 11/1996 | DeTemple et al. | 395/501 |
| 5,621,812 A | 4/1997 | Deaton et al. | 382/100 |
| 5,637,847 A | 6/1997 | Watanabe | 235/383 |
| 5,689,650 A * | 11/1997 | McCelland et al. | 395/236 |
| 5,778,348 A | 7/1998 | Manduley et al. | 235/375 |
| 5,804,807 A | 9/1998 | Murrah et al. | 235/383 |
| 5,825,002 A | 10/1998 | Murrah et al. | 235/383 |
| 6,144,848 A * | 11/2000 | Walsh et al. | 235/380 |

* cited by examiner

DEVICE AND METHOD FOR SECURE DATA UPDATES IN A SELF-CHECKOUT SYSTEM

RELATED APPLICATIONS

This application is a continuation of U.S. patent application Ser. No. 09/153,832, filed Sep. 15, 1998, now U.S. Pat. No. 5,979,753, which is a continuation of U.S. patent application Ser. No. 08/706,579, filed Sep. 5, 1996, now U.S. Pat. No. 5,825,002.

FIELD OF USE

This invention relates generally to a system and method for preventing the unauthorized purchase of goods using a portable data collecting terminal in a self-checkout system, and more specifically to a system and method for ensuring that purchases made with a scanner terminal in a self-checkout store are made by the authorized customer to whom the terminal was issued and that customer information stored by the system is updated only by person's having knowledge of a recognized authorization code.

BACKGROUND OF THE INVENTION

Self-checkout systems have been previously described and implemented which provide customers with scanners to track their purchasing in stores. Examples of such systems are described in Dutch Patent Application No. 9002296 ("the '296 Application") and U.S. Pat. No. 5,468,942 to Oosterveen et al. ("the Oosterveen Patent"). The '296 Application and the Oosterveen Patent describe systems in which authorized customers are issued a terminal having an integrated bar code scanner to record merchandise purchases. The scanners maintain a list of merchandise selected for purchase by the customer within internal memory means. Prior to exiting the store, the information stored in the memory of the scanner is downloaded through a communication port attached to a terminal dispenser, and a printed receipt of the customer's purchases is printed on a printer. The customer then proceeds to a checkout register where the customer tenders payment for the purchased merchandise. The systems may provide for the occasional audit of customers using the system to ensure integrity of the self-service system.

SUMMARY OF THE INVENTION

Self-checkout systems have proven to be a useful and valuable source of customer purchasing information. Such systems permit store operators to maintain detailed and accurate data recording customers' purchases, credit histories and buying habits. This information is stored in a centralized data processing system having individual customer data files. In order to maintain customer trust in the system as a whole, it is important that individual customer data files be secure and free from unauthorized modification and use.

It is therefore, a general object of the present invention to advance the state of the art of data collection systems such as the type used in self-checkout systems.

It is another object of the present invention to provide a secure system for retaining and updating customer information such as purchasing and credit histories.

It is a further object of the present invention to provide secure updates of customer data files with data collected with a portable data collecting terminal in a self-checkout system.

It is a further object of the present invention to provide for a secure self-checkout system wherein a portable data collecting terminal will not be used to update or otherwise display customer information in the absence of the entry of a predetermined information by an authorized customer.

It is a further object of the invention to provide for the return and retention of stolen or and mishandled data collecting terminals at a terminal dispenser.

In the context of the above objectives, a system is provided which ensures that customers who seek to either modify, reference or otherwise use customer data files are in fact authorized to make use of the referenced customer data file. The two primary sources for the modification and/or use of such customer data files by customers are either the portable data collecting terminal used by a customer or a customer service desk where customers having questions or difficulty using the systems may have such customer data files referenced on their behalf by the store operators.

In a preferred embodiment of the present invention, a system is provided for securing the return of a data collecting terminal and its associated customer data to a terminal collector. Initially a data collecting terminal is issued to an authorized customer. The terminal is assigned to such customer. Upon its return to the terminal collector or other device for collecting terminals, the terminal is placed in the terminal collector and locked in place with a locking mechanism. Once locked in place, customer information files collected during the use of the terminal are updated with data collected with the terminal only upon the receipt of a recognized customer authorization code such as a secret pin number or recognized customer card. In the absence of such authorization, data collected on the data collector is stored in a non-authorized data storage bank and the terminal is retained in place so as to keep the unauthorized user from taking back the terminal. In addition, an unauthorized return signal is generated to warn attendants of the possible return of a stolen or mishandled terminal to a terminal dispenser.

In addition, a service desk is provided having a service console for communicating with the central processing system. The service desk includes means for verifying the customer's authority to use the system and means for completing a transaction in the event a transaction by a customer was mishandled by the customer when they were using the self-checkout system.

BRIEF DESCRIPTION OF THE DRAWINGS

The present invention will be understood and appreciated more fully from the following detailed description, taken in conjunction with the drawings, in which.

DETAILED DESCRIPTION OF THE PREFERRED EMBODIMENTS

By way of example, the present invention is illustrated in terms of a method and apparatus used in a self-checkout system in a retail store. The example application described herein is only one example application of the present invention and is provided for the purpose of better explaining the present invention. The present invention may be applied to any number of other data collection systems having a number of potential users employing a portable data collection terminal to update a centralized data file. Thus, the present invention should not be limited to the specific example described herein.

I. Self-checkout System Data Collection

Figure 1:
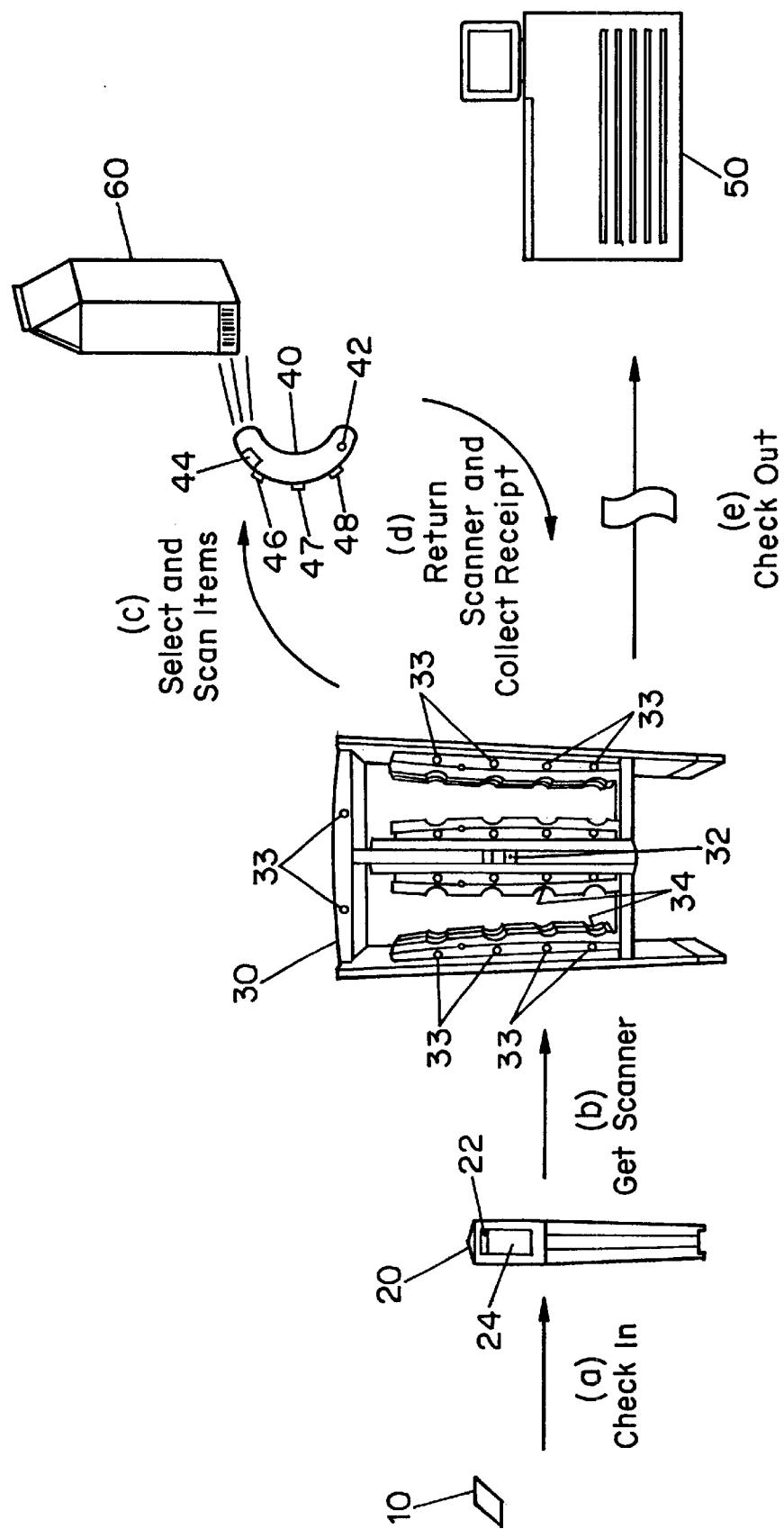
FIG. 1 is a perspective view of the system components utilized by a customer in a self-checkout system employing a preferred embodiment of the present invention.

As illustrated in FIG. 1, a customer is provided with a customer loyalty card 10 having encoded customer data stored thereon. Corresponding customer information is also placed in a customer data file on a central storage system for the self-checkout system. Once a customer loyalty card 10 has been issued and a corresponding customer data file is established on the central storage system, the customer may then use the system to perform self-checkout of merchandise distributed in a facility employing the self-checkout system.

To use the system, a customer proceeds to an entrance unit 20 and inserts their customer card 10 into slot 22. A card reader on the entrance unit 20 reads the information stored on the card and checks with the central storage system to confirm that a corresponding customer data file exists and that the customer is authorized to use the system. Once system approval is obtained, a display unit 24 on the entrance unit 20 instructs the user to proceed to a designated area of a dispenser unit 30 to retrieve a designated data collection unit such as a bar code reader with integrated terminal features 40. Although not shown, the system could also be provided with a entry gate which is activated to permit the customer through upon the assignment of the bar code reader 40 and blinking lights 33 on the side of the dispenser and above the dispenser to direct the customer to the proper location. These systems are especially necessary in large stores having a high number of dispenser units.

The bar code reader 40 is provided with a flashing light 42 to assist the customer in retrieving it after it has been assigned to the customer. The flashing light 42 is activated by the central processor (shown in FIG. 2) after it has been assigned to the customer and the assignment is recorded in the customer's data file. In an alternative embodiment, the bar code reader is further provided with an audible signal generator to assist the user in finding it in the terminal dispenser and a visual display for displaying either the customer's name or some other form of customer identifiable code.

The bar code reader 40 is stored in one of a plurality of reader slots 34 in the dispenser unit 30. Each of the slots is physically and electronically marked and may be provided with locking means for locking the bar code reader 40 in place until the bar code reader is assigned for use to a customer. The physical marking is used to direct the customer to the proper location on the dispenser, i.e., location "A9," and the electronic marking is provide as a means for identifying the location of the bar code reader by the central processor. The electronic means may comprise a bar code located on the terminal dispenser 30 such that when the bar code reader 40 is locked in place, the bar code can be read by the bar code reader 40 and communicated to the central processor. Once the bar code reader 40 is assigned to a customer, the locking means is disengaged. In the event the bar code reader is not removed from the slot 34 after a predetermined time period, it is again locked and the customer data file for the customer to whom it was assigned is updated to reflect that the customer did not take possession of the reader within the allotted time period.

Prior to issuance to a customer, the bar code reader 40 could also be required to scan the bar code located on the terminal dispenser as a self-diagnostic tool. In a preferred embodiment, the bar code is sufficiently degraded to test the outer boundaries of the bar code readers capabilities. Thus, if the bar code reader is unable to read the bar code and communicate the bar code symbol top the central processor, it will not be assigned. The central processor will notify the supervising attendant that the terminal is not functioning properly.

Once a customer has been issued a bar code reader 40, the customer proceeds through the retail facility and uses the bar code reader 40 to record purchases. Preferably each item is either coded with a code which is recognizable to the bar code reader, or in the case of produce which is sold by weight, is provided with a machine for generating an adhesive bar coded ticket after the produce is weighed. Upon scanning of the code on a selected merchandise item 60, a display 44 on the bar code reader 40 displays product information such as price, product name, quantity and nutritional information. In a preferred embodiment of the present invention, the bar code reader 40 is provided with a processing means for recording all items selected by the customer. Alternately, the bar code reader 40 acts as a dumb terminal with radio frequency communication means. In such case, all information is stored in a central location and the bar code reader 40 simply communicates data to the central location.

In a preferred embodiment of the present invention, the reader permits a customer to add a product to their record through the selection of an "add" key 46, return a scanned product previously selected by selecting a "minus" key 47 or simply to perform a price check or other information check by pressing an "equals" key 48. In a preferred embodiment, the "equals" key may also be used to provide the customer with a running total of the products selected.

Once the customer has completed their product selection, the customer returns the bar code reader 40 to the dispenser unit 30 where it is placed in an open slot 34. Upon return of the bar code reader 40, information collected with the bar code reader 40 is downloaded to a central processing unit and a ticket for the items is issued to the customer from a printer 32 which is located near or on the dispenser. Communication between the bar code reader 40 and the central processing unit is completed through a communication network which may consist of either a wired communication bus which coupled through a port on the bar code reader 40 when it is placed in the dispenser unit 30, or through an RF network which is active when the bar code reader 40 is placed in the terminal dispenser 30. In an alternative embodiment of the present invention, rather than issuing a ticket at the terminal dispenser location, a card reader and data entry device are provided at the cash register. The customer may then enter their customer card and pin number at the cash register location.

Prior to updating any customer data files, the customer is requested to insert the customer loyalty card 10 and/or enter a pin code to ensure that the customer is in fact the same person who initially retrieved the scanner. This is especially important in the event the system provides for electronic fund transfers for payment and information for such transfers are stored wholly or partially in a customer data file.

Once the central processing system has successfully retrieved the customer information from the bar code reader 40, the customer then proceeds to a checkout register 50 for payment of the products selected. In the event a debit operation was made at the dispenser unit 30, confirmation of payment. The checkout system may be an automated system or a manually operated system. The ticket is either scanned or otherwise read at the checkout 50 and the customer is asked to pay for the goods selected if payment has not been previously made.

Recognizing that some goods may not be scanned due to coding damage or other issues, a customer may proceed to a manned checkout station for the addition of items to their receipt. At such point, additional payment made need to be made using traditional payment schemes, or if the central processing unit is being used to provide a debit function, customer card and pin code information may need to be entered at the checkout facility. After all items are selected and the transaction is complete, the customers data file is updated in the central processing unit to reflect the customer's shopping activities.

In an alternative embodiment of the present invention, the customer loyalty card is also used to selectively activate and deactivate the portable bar code reader by scanning the customer loyalty card with the bar code reader. Thus, in the event the customer wishes to maintain the bar code reader but does not wish to have it activated, they simply scan their customer loyalty card. This deactivates the bar code reader from updating a session data-record of items selected for purchase by the customer which is being generated with the bar code reader. When the customer wishes to reactivate the bar code reader, the customer simply re-scans their customer loyalty card. This function is useful in situations were the customer may not wish to maintain constant supervision over the scanner. For instance, in the event a customer with children wishes to stop at the store cafeteria or try on some clothes in a dressing room, the customer can deactivate the bar code reader in order to prevent the children from accidentally scanning or deleting items into the session data record.

II. Central Processing System

Figure 2:
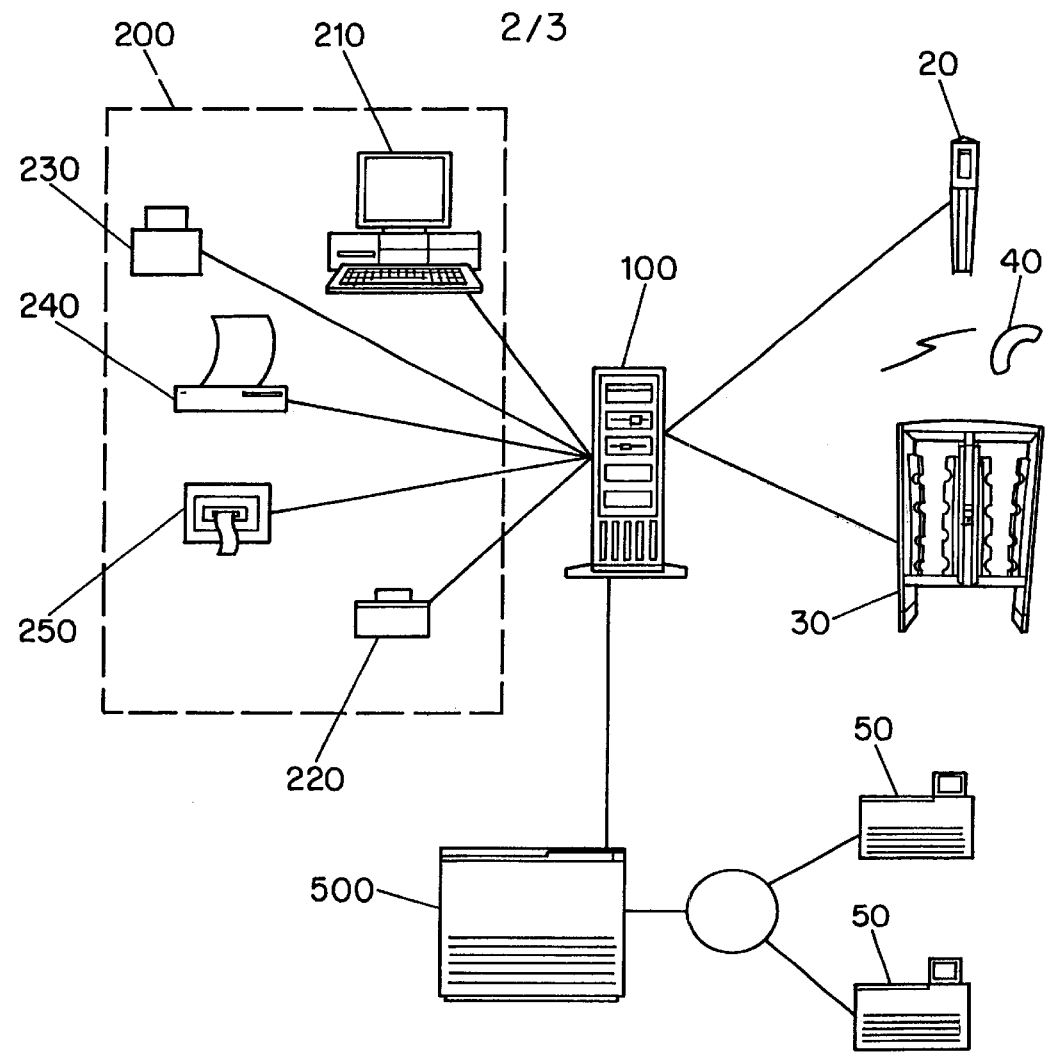
FIG. 2 is a perspective view of a self-checkout system employing a preferred embodiment of the present invention.
Figure 3:
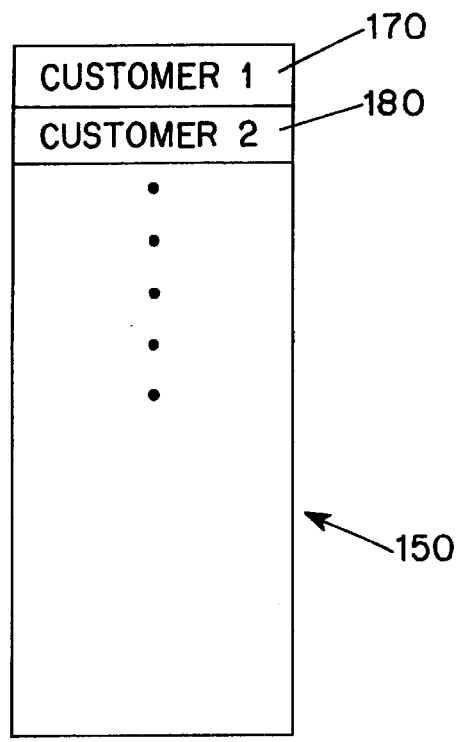
FIG. 3 is a block diagram illustration of a database containing a plurality of customer data files.
Figure 4:
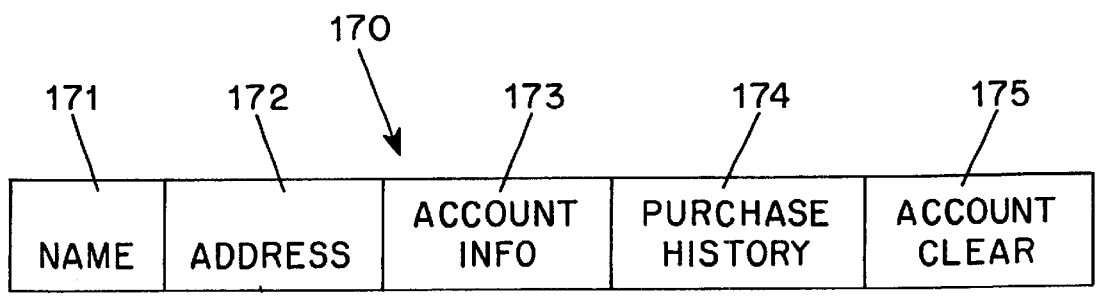
FIG. 4 is a block diagram illustration of a block of data for an individual customer.

Turning to FIG. 2, the data processing functions of the system are controlled by a central processing system 100. This central processing system could be either a single high capacity computer, or a distributed network of computers. The system is coupled to the entrance unit 20, the dispenser unit 30 and may also be coupled through an RF network to each of the bar code readers 40 which are dispensed through the dispenser unit 30. Alternatively, the dispenser unit 30 is provided with a communication bus for communicating data from the bar code reader 40 the central processing system 100 once the bar code reader 40 is placed in the dispenser unit 30. The central processing system 100 includes memory having a data file 150, (FIGS. 3 and 4) for each of the customers authorized to use the system.

After the entrance unit 20 reads the information on a customer card 10, the entrance unit 20 communicates the data retrieved from the customer card to the central processing system 100. The central processing system searches for and confirms that the data on the customer card 10 corresponds to a person authorized to use the self-checkout system and that no blocking information is present which would prevent the user form using the system. In a preferred embodiment of the present invention, the central processor system maintains a data file 170, FIGS. 3 and 4 for each customer. In a preferred embodiment, the data file 170 includes the following data fields: customer name 171, address 172, account information 173 (such as amounts due), purchase histories 174 (last five shopping sessions) and an account clear field 175. The account clear field 175 is used to indicate that (i) the customer has not previously performed an illegal function such as (ii) not returning a bar code reader 40, (iii) generated excessive account debits, or (iv) has deceased.

The entry of the customer card in the entrance unit 20 results in the communication of the data stored in the customer card to the central processing unit. Once the central processing system 100 determines that the customer card entered into the entrance unit 20 belongs to an authorized customer and that the corresponding customer is cleared to use the system, the central processor assigns a bar code reader 40 to the customer, communicates the assignment to the entrance unit 20 where it is displayed and to the bar code reader 40 in the dispenser unit 30. Upon receiving the assignment signal, the designation light 42 on the bar code reader is activated and the locking mechanism in the dispenser unit for the designated bar code reader 40 is disengaged. In addition, the account clear field 175 is changed to reflect that a bar code reader 40 has been issued and not returned.

The central processor system 100 updates the customer data file 170 to reflect the time, date and the bar code reader 40 designation for this session. In the event the bar code reader 40 is a batch type system, all customer selections with the bar code reader 40 are stored locally in the memory of the bar code reader 40. Alternatively, the system 100 and the bar code reader 40 may be provided with a wireless communication network such as an RF communication network. If such a system is used, all central processing customer transactions may be stored remotely on a system controlled by the central processor system 100.

Once the customer has completed the session and returns the bar code reader 40 to the dispenser unit 30, the customer is prompted to enter the customer loyalty card 10 which was used to retrieve the bar code reader 40 upon entry and enter an additional credit card, authorization code and/or signature on a signature pad if the transaction requires a debit or EFT transaction. Once this data is received, the customer data file 170 is updated to reflect changes in the purchase history field 173 and account information field 173. If the bar code reader 40 is returned to the dispenser and the transaction is completed without incident, i.e., the payment is received, the account clear field 175 is then cleared permitting the user to permit subsequent use of the system. Alternatively, all customer account credit and payment information is stored on a secure server and encoded. The encoding mechanism may be a forty bit key or higher depending on the amount of security required for the system and whether the information will be made available over a public network.

In an alternative embodiment of the present invention, the locking mechanism of the dispenser 30 is used to engage the bar code reader 40 once it is returned into slot 34 for final processing. If the bar code reader 40 was returned by someone who stole or simply took some other customer's bar code reader by mistake, the bar code reader 40 is kept in the system until it is released by the authorized person or a customer service employee.

II. Service Desk

In a preferred embodiment, the service desk facility 200 performs three basic functions: (1) customer management; (2) scanner management; and (3) report processing. Each of these functions is described below:

1. Customer Management

The service desk facility 200 includes a customer service console 210. The console 210 may comprise a PC having a display terminal, keyboard, data processing unit and a communication bus coupled to the central processing system 100 through either a local or wide area network. The customer service console 210 is used to enter customer information such as new customer information. The entry of such information will generate a customer data file for the new customer and designate a customer loyalty card to the new customer. Customer data may be stored on the customer loyalty card using a card writer 230.

In the event a customer has a complaint regarding the record maintained by the bar code reader 40 or is for some reason locked out of the system or if some other hardware problem is presenting itself on the system, the service desk console 210 may also be used to retrieve the relevant customer data file from the central processing system 100 and information from the bar code reader 40 issued to the customer. In order to read the bar code reader 40, the system console may be provided with a separate bar code receiver for communicating with the bar code reader 40. The customer service attendant may then clear, correct or otherwise tend to any system malfunction or customer questions using the retrieved data.

In order to assist the customer, the service facility 200 is provided with a card reader 220 and, if required, a numeric keypad on the console 210 to receive a security pin code. This will confirm that the customer seeking assistance is in fact an authorized customer. In the absence of such security measures, a person who finds a customer card could easily use the system to purchase items on an authorized customer's account.

2. Dispenser Control

The service facility also functions to control the activity of the dispenser unit 30. The console 210 is connected to the central processing system 100 and may override the locking function of the dispenser so as to lock everyone out after a certain time, i.e., 10 minutes before closing, and to reopen the system in the morning. In addition, the service console 210 may be used to maintain surveillance over bar code readers 40 which have been issued, returned without receipt of an authorization code and not retrieved after the system has designated a bar code reader for use by a customer, thus providing a mechanism for identifying customer misuse or errors in using the system.

In the event a customer should lose a printed receipt or receive an illegible copy (or require a copy from a prior shopping session), a customer receipt printer 250 is also provided.

In the event a line forms at the entry unit 20, the service facility can also function as a supplemental entrance unit. The service facility is provided with a card reader 220 and a keypad on the console 210 for entry of a pin code.

3. Report Processing

The customer service facility 200 may also be used to generate reports such as daily, weekly and annual sales report. These reports may be printed on a report printer 240 at predetermined times (i.e., every Monday at 6:00 A.M.) or at the entry of a request on the console 210.

As shown in FIG. 2, the self-checkout system of the present invention may be coupled directly to an existing point of sale (POS) system 500 which is connected to and supervises activities on existing checkout registers 50. The existing POS system 500 could be used to maintain inventory histories, update product information and other system functions. The system requirements for the central processing system 100 are therefore diminished and the necessary system requirements are reduced. This effectively reduces the cost of implementing the self-checkout system in a retail facility having an existing system.

In an alternative preferred embodiment of the present invention, in the event the existing POS system 500 has sufficient system resources available, the functions of the central processing system 100 are incorporated into the POS system 500.

Based on the above disclosure, it would be obvious to those skilled in the art to make numerous modifications to the herein described embodiments without straying from the present invention. For instance, various modifications could be made to the customer data files to record various forms of additional customer information. In addition, various system components could be integrated to provide the same overall functions, i.e., attaching the entrance unit 20 to the dispenser unit 30. Moreover, although certain embodiments of the present invention are described in the context of an RF network system, it would be understood by those skilled in the art that equivalent systems could be implemented using various wireless communication systems.

I claim:

1. A system for assisting a customer in a retail store in the purchase of goods selected by said customer, said system comprising:

a) a central database including a plurality of customer files, wherein each of said customer files is associated with each of a plurality of customer transactions;

b) a computer for communicating to said customer an information message pertaining to the goods selected by said customer;

c) a communication network for transmitting an identification for each of a plurality of selected goods to the central host and updating said customer file to include the plurality of selected goods; and d) an automated payment device for collecting the customer's preferred payment method, communicating said payment request to an electronic fund transfer system, receiving an authorization code from the electronic fund transfer system and recording the transaction on the central database by updating the customer's file associated with the authorization code;

whereby the customer file is updated to include the plurality of goods selected by the customer and the customers payment information.

2. The system of claim 1, wherein the customer's preferred payment method is a debit payment method.

3. The system of claim 1, wherein the customer's preferred payment method is a credit payment method.

4. The system of claim 1, further comprising an optical indicia reader for assisting the customer with selecting the goods by having the customer scan a unique optical indicia labels associated with each of the selected goods.

5. A method for assisting a customer in a retail facility comprising the steps of:

a) issuing a customer card to each of a plurality of customers;

b) submitting the customer card to an entrance head and extracting customer data from said entrance head;

c) communicating the customer data to a central host and obtaining authorization for release of a shopping terminal located on a multiple terminal dispensing device to a customer;

d) assigning a terminal to the customer at the entrance head;

e) identifying the terminal assigned to the customer on a display of the entrance head with a customer perceptible indicator in the vicinity of the assigned terminal;

f) collecting information pertaining to the customer's retail purchases on the assigned terminal; and g) completing the transaction with an automated payment scheme by obtaining a complete list of goods purchased by the customer, obtaining authorization from an electronic funds transfer system and updating the customer files with the transaction and a record of the electronic funds transfer system payment.

6. A method for completing a sales transaction using a bar code reading terminal, said method comprising the following steps:

reading at least one bar code from a product with the bar code reading terminal;

transmitting data representative of the bar from the terminal to a transaction terminal and associating said data with a specific customer electronic account;

generating a purchase request; and completing an electronic payment request for the purchased items based upon an authorization and information stored at the specific customer electronic account.

* * * * *